United States Patent
Yoo et al.

(10) Patent No.: US 11,416,034 B2
(45) Date of Patent: Aug. 16, 2022

(54) FLEXIBLE DISPLAY DEVICE

(71) Applicant: LG Display Co., Ltd., Seoul (KR)

(72) Inventors: DongKwan Yoo, Paju-si (KR); GiHyon Jun, Paju-si (KR); InSeop Ka, Paju-si (KR); SeokHyo Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 240 days.

(21) Appl. No.: 16/894,176

(22) Filed: Jun. 5, 2020

(65) Prior Publication Data
US 2020/0409418 A1 Dec. 31, 2020

(30) Foreign Application Priority Data

Jun. 28, 2019 (KR) ........................ 10-2019-0077548

(51) Int. Cl.
*G09F 9/30* (2006.01)
*G06F 1/16* (2006.01)

(52) U.S. Cl.
CPC .......... *G06F 1/1652* (2013.01); *G06F 1/1624* (2013.01); *G06F 1/1675* (2013.01); *G09F 9/301* (2013.01); *G06F 1/1601* (2013.01)

(58) Field of Classification Search
CPC ... H01L 51/0097; G09F 9/301; G06F 1/1601; G06F 1/1652; H05K 5/0017; H05K 5/0217; G02F 1/133308; G02F 1/133314
See application file for complete search history.

(56) References Cited

U.S. PATENT DOCUMENTS

| | | | |
|---|---|---|---|
| 9,081,540 B1 * | 7/2015 | Cho | G06F 1/1601 |
| 9,541,807 B2 | 1/2017 | Park et al. | |
| 9,980,399 B2 | 5/2018 | Cho et al. | |
| 10,113,685 B2 | 10/2018 | Cho et al. | |
| 2013/0155655 A1* | 6/2013 | Lee | G02F 1/133 361/752 |
| 2014/0132487 A1 | 5/2014 | Park et al. | |
| 2014/0198465 A1* | 7/2014 | Park | G09F 9/00 361/749 |
| 2014/0226266 A1* | 8/2014 | Kang | H01L 51/0097 361/679.01 |

(Continued)

FOREIGN PATENT DOCUMENTS

| | | |
|---|---|---|
| CN | 103811501 A | 5/2014 |
| CN | 105047084 A | 11/2015 |

(Continued)

OTHER PUBLICATIONS

Wang, M., "Chapter 2 Mechanical Parts in the Mechatronics System: Mechatronics Systems," China Central Radio & TV University Press, Aug. 2012, pp. 32-36.

*Primary Examiner* — Nidhi Thaker
(74) *Attorney, Agent, or Firm* — Fenwick & West LLP

(57) ABSTRACT

Provided is a flexible display device including a back cover supporting a rear surface of a display panel, a bending member bent with a slow curvature and supporting a rear surface of the back cover, a sliding member supporting the bending member to be rotatable, mounted on the rear surface of the back cover, and rotating the bending member, while sliding up and down on the back cover, and a rotation support member having one end portion slidably and rotatably engaged with an end portion of the bending member and the other end portion rotatably engaged with the back cover.

19 Claims, 13 Drawing Sheets

(56) References Cited

U.S. PATENT DOCUMENTS

| | | | | |
|---|---|---|---|---|
| 2014/0354519 A1* | 12/2014 | Lee | ............... | G09F 9/301 |
| | | | | 345/76 |
| 2015/0043136 A1* | 2/2015 | Kim | ............... | H02P 31/00 |
| | | | | 361/679.01 |
| 2015/0185761 A1* | 7/2015 | Song | ............... | H04M 1/0268 |
| | | | | 361/679.21 |
| 2015/0296641 A1* | 10/2015 | Song | ............... | F16M 11/22 |
| | | | | 361/679.01 |
| 2016/0353594 A1* | 12/2016 | Cho | ............... | F16M 11/08 |
| 2017/0188470 A1 | 6/2017 | Cho et al. | | |
| 2018/0298997 A1 | 10/2018 | Chen | | |
| 2020/0323087 A1* | 10/2020 | Hwang | ............... | H05K 5/0247 |
| 2021/0181797 A1* | 6/2021 | Wolff | ............... | G06F 1/1652 |

FOREIGN PATENT DOCUMENTS

| | | |
|---|---|---|
| CN | 106205389 A | 12/2016 |
| CN | 206573977 U | 10/2017 |
| CN | 208769956 U | 4/2019 |
| CN | 109804330 A | 5/2019 |
| CN | 110136591 A | 8/2019 |
| JP | 2017120419 A | 7/2017 |
| WO | WO 2018/097633 A1 | 5/2018 |

* cited by examiner

FLEXIBLE DISPLAY DEVICE

CROSS-REFERENCE TO RELATED APPLICATION

This application claims priority from Republic of Korea Patent Application No. 10-2019-0077548, filed on Jun. 28, 2019, which is hereby incorporated by reference in its entirety.

BACKGROUND

Field

Embodiments of the present disclosure relate to a flexible display device.

Description of Related Art

In general, a liquid crystal display (LCD) device, a plasma display device, a field emission display device, and a light emitting display device, and so on are under active study as flat display devices. Among them, the LCD device and the light emitting display device have attracted much interest due to their benefits of mass production, ease of driving means, and realization of high image quality.

Along with research efforts to overcome the technical shortcomings of these flat display devices, the necessity of research and development is particularly highlighted in terms of the structures of flexible display products such as curved and rolling types which are more appealing to users.

However, a flexible display device has such a structure that to change the curvature of a display panel, a mechanism of changing the curvature should be coupled to the rear surface of the display panel. Due to the limitation of the coupling mechanism, it is difficult to realize a constant curvature from the center to both end portions of the display panel.

Moreover, since it is difficult to rapidly change the curvature of the display panel and maintain the changed curvature in the structure of the flexible display device, various users' demands may not be accommodated.

Therefore, there is a need for research to solve the above-described problems.

SUMMARY

Embodiments of the present disclosure provide a flexible display device for which a user may freely change a curvature to that of a flat display or a curved display.

Further, embodiments of the present disclosure provide a flexible display device for which a user may easily achieve a desired curvature from the center to both end portions of a display panel irrespective of the size of the flexible display device, and thus which may accommodate various users' demands.

The objects of the embodiments of the present disclosure are not limited to what have been described above, and those skilled in the art will clearly understand other objects not mentioned herein from the following description.

According to an aspect, embodiments of the present disclosure provide a flexible display device including a back cover supporting a rear surface of a display panel, a bending member bent with a slow curvature and supporting a rear surface of the back cover, a sliding member supporting the bending member to be rotatable, mounted on the rear surface of the back cover, and rotating the bending member, while sliding up and down on the back cover, and a rotation support member having one end portion slidably and rotatably engaged with an end portion of the bending member and the other end portion rotatably engaged with the back cover.

According to embodiments of the present disclosure, there may be provided a flexible display device for which a user may freely change a curvature to that of a flat display or a curved display.

According to embodiments of the present disclosure, there may be provided a flexible display device for which a user may easily achieve a desired curvature from the center to both end portions of a display panel irrespective of the size of the flexible display device, and thus which may accommodate various users' demands.

DETAILED DESCRIPTION

Figure 1:
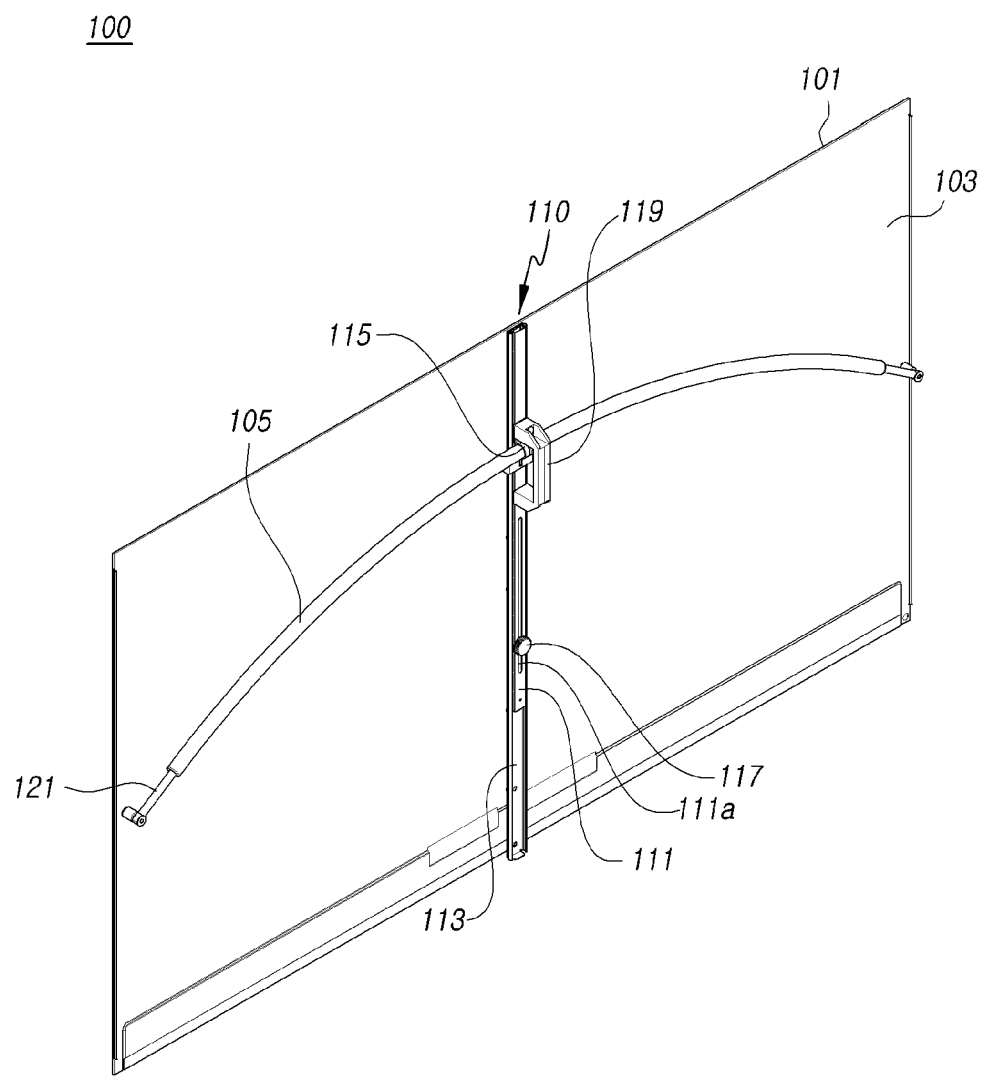
FIGS. 1, 2 and 3 are perspective views illustrating a flexible display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
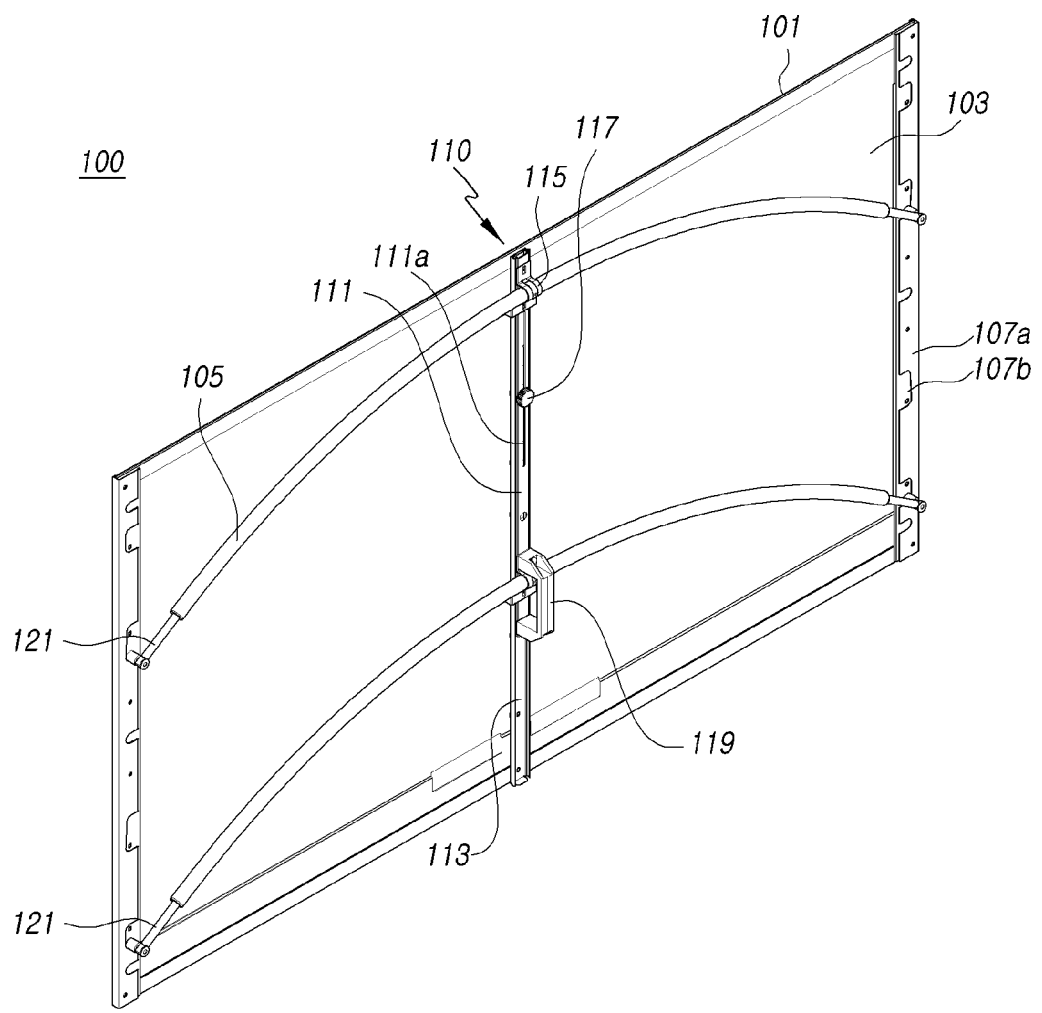
Figure 3:
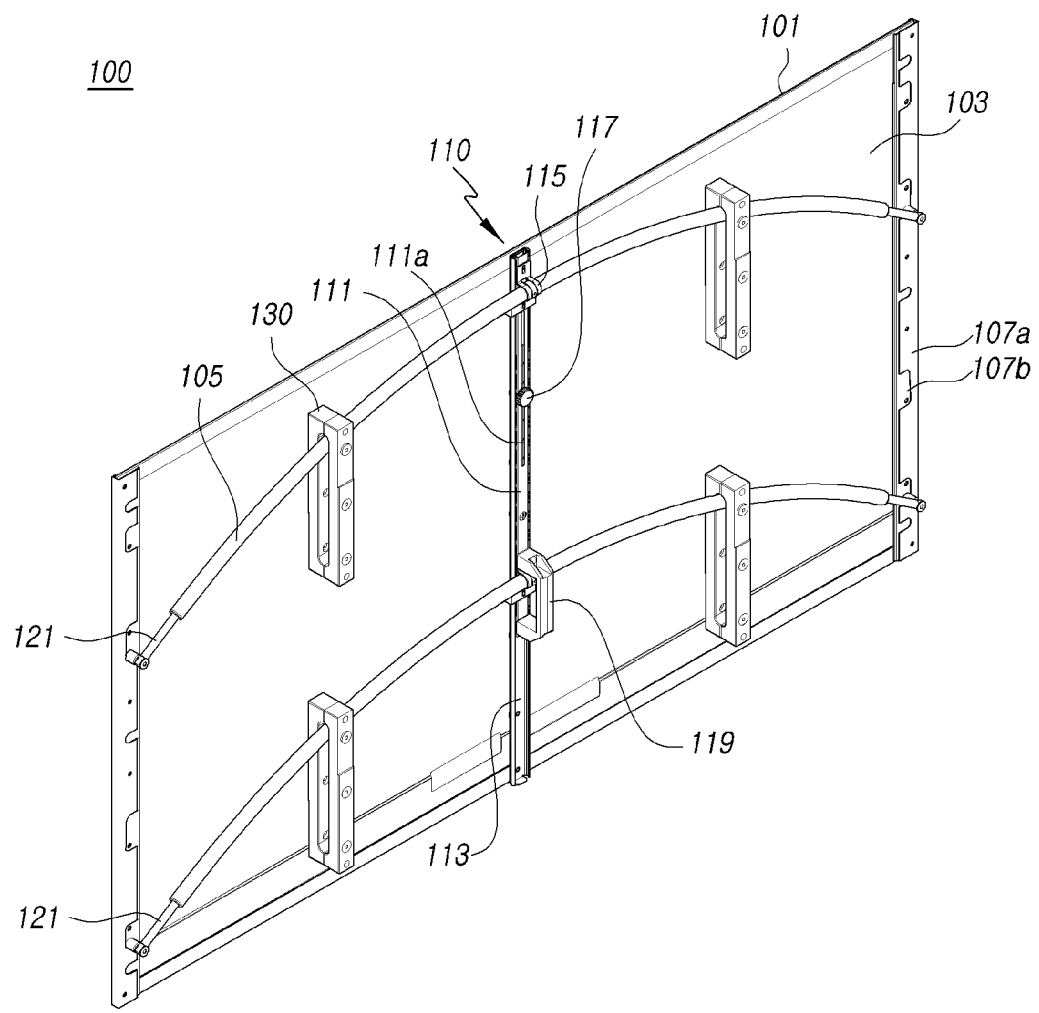
Figure 4:
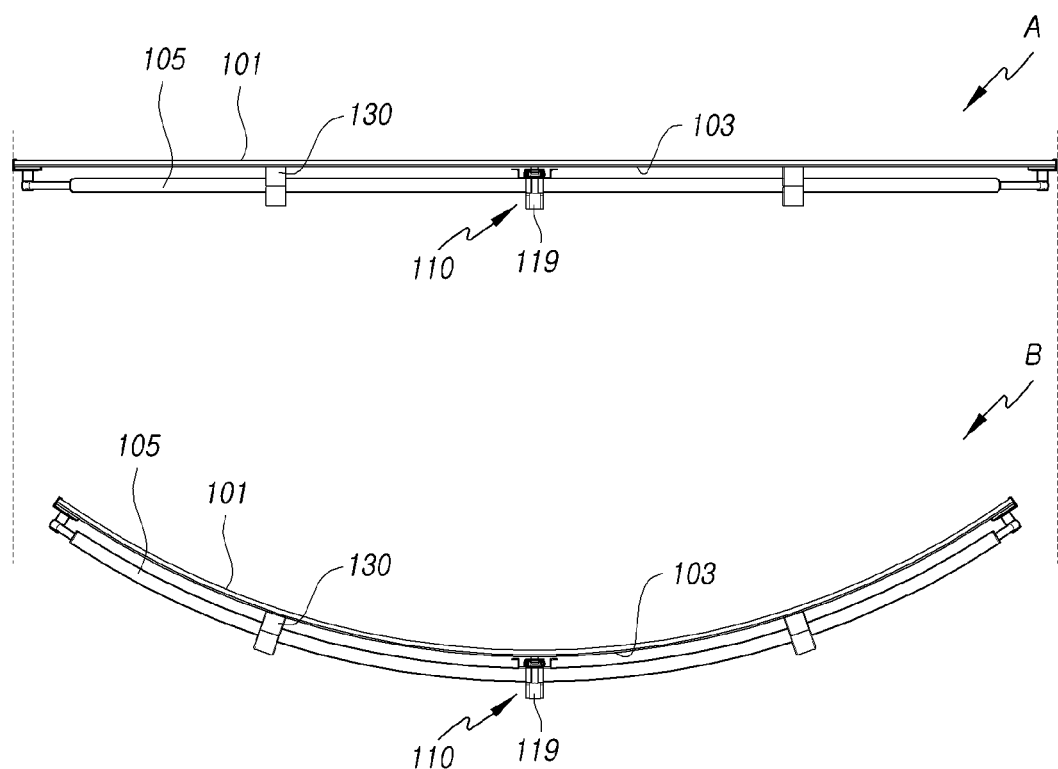
FIG. 4 is a plan view illustrating the flexible display device according to embodiments of the present disclosure.
Figure 5:
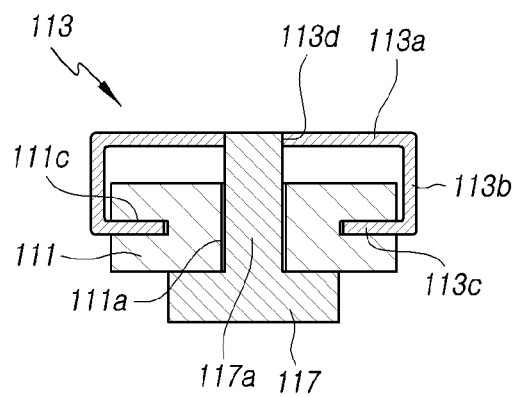
FIGS. 5 and 6 are sectional views illustrating a part of the flexible display device according to embodiments of the present disclosure.
Figure 6:
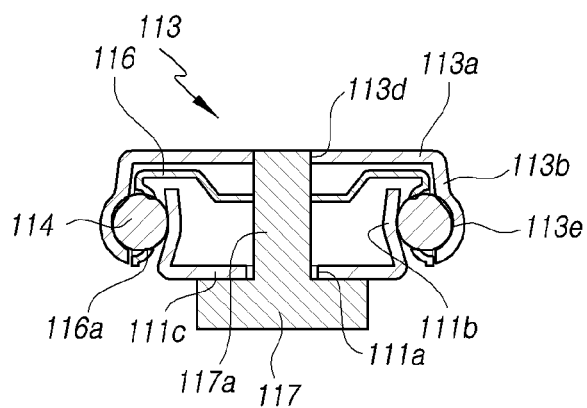
Figure 7:
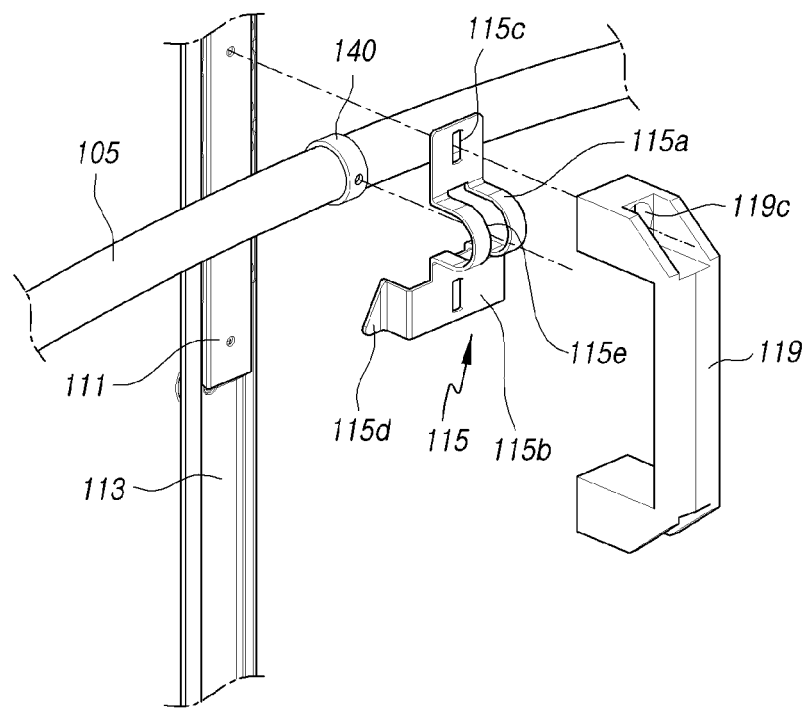
FIGS. 7 and 8 are perspective views illustrating a part of the flexible display device according to embodiments of the present disclosure.
Figure 8:
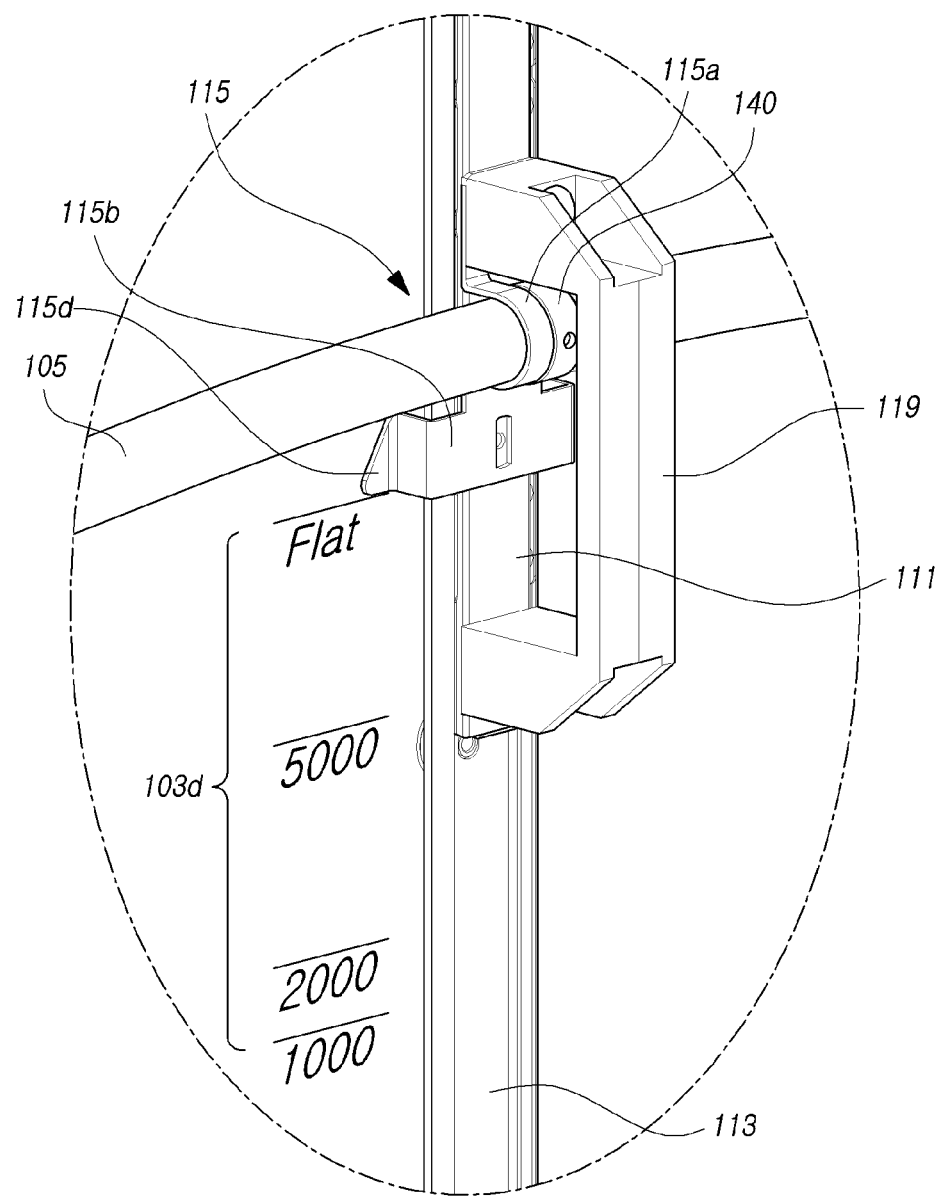
Figure 9:
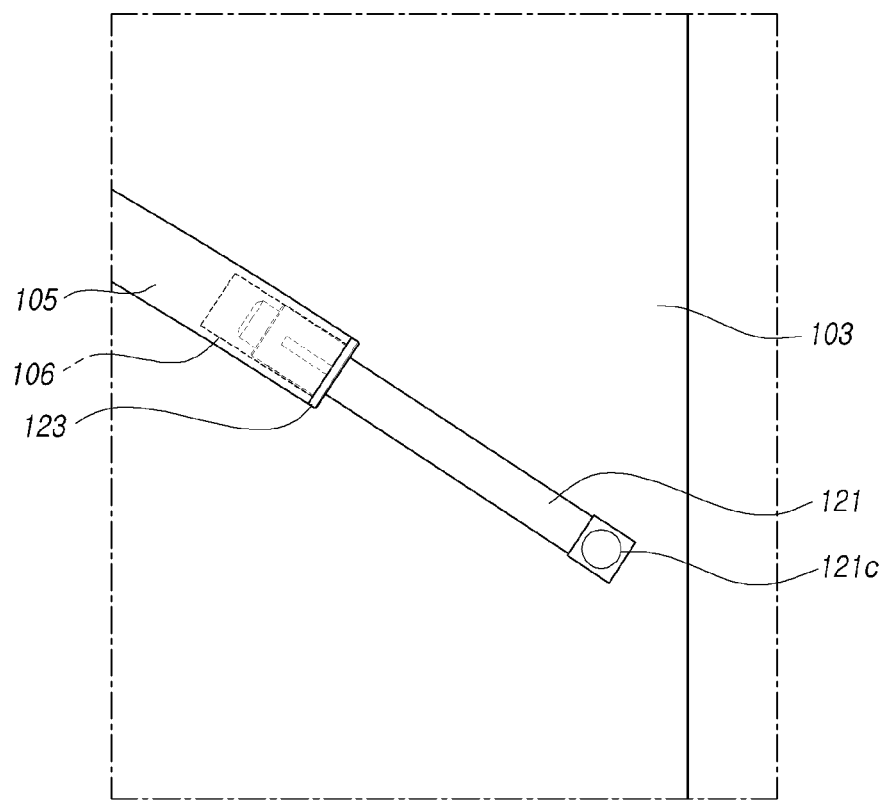
FIG. 9 is a rear view illustrating a part of the flexible display device according to embodiments of the present disclosure.
Figure 10:
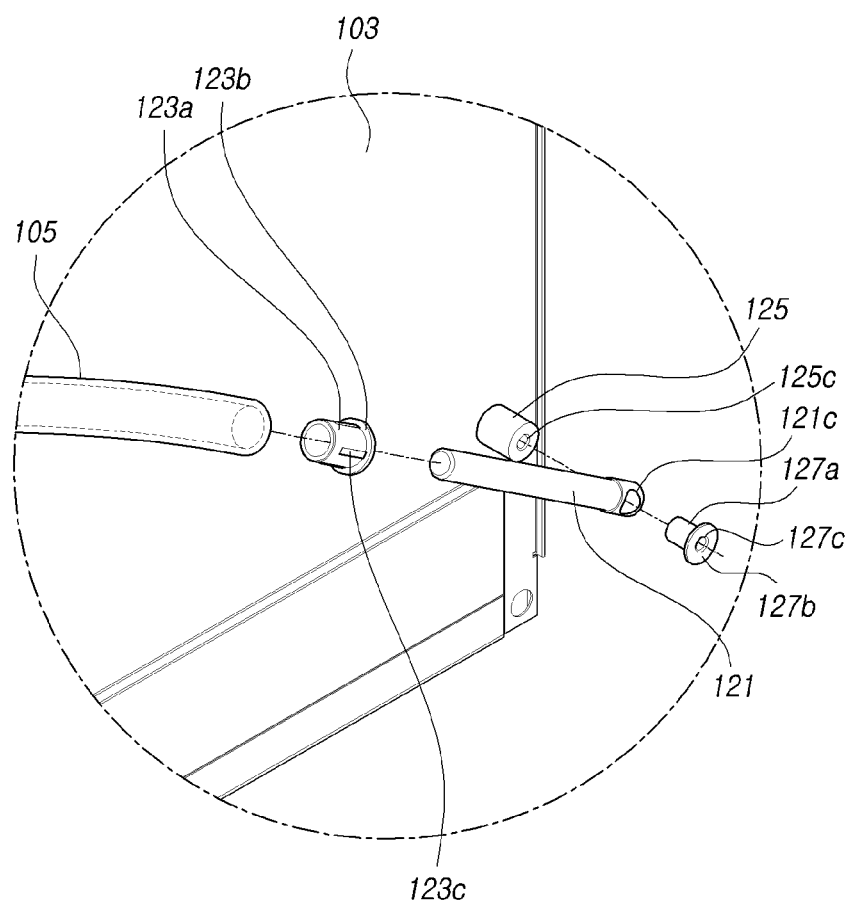
FIGS. 10 and 11 are respectively a perspective view and a sectional view illustrating a part of the flexible display device according to embodiments of the present disclosure.
Figure 11:
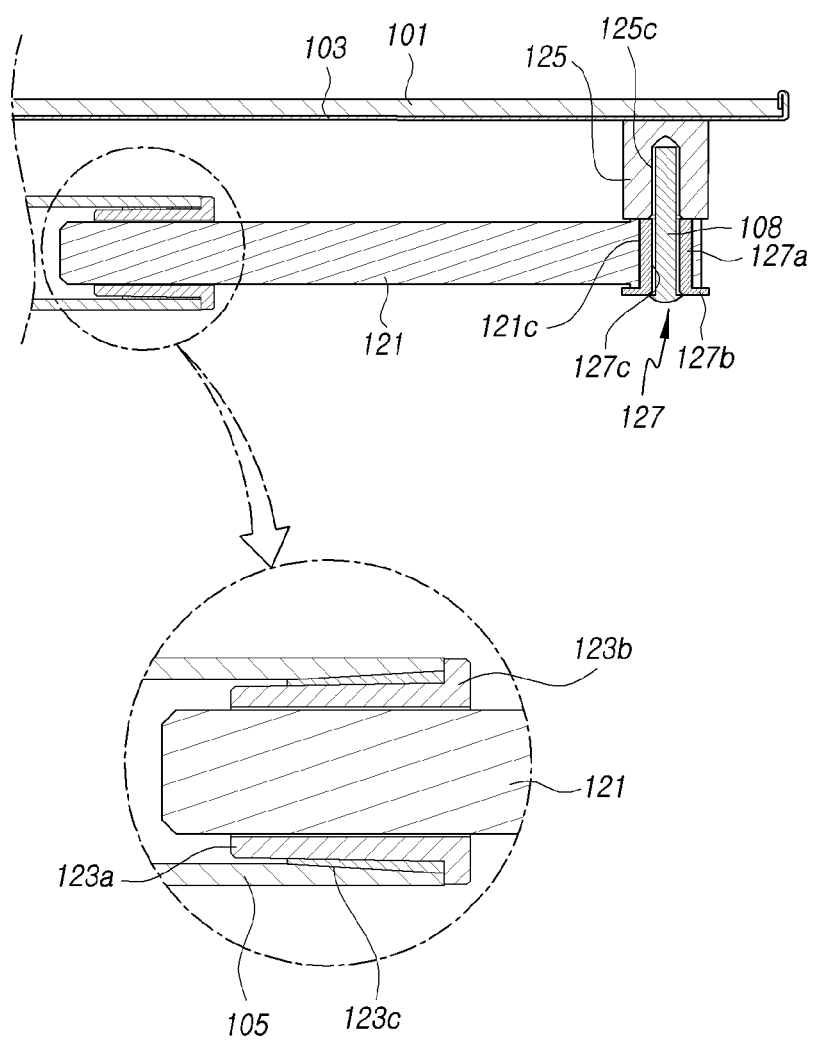
Figure 12:
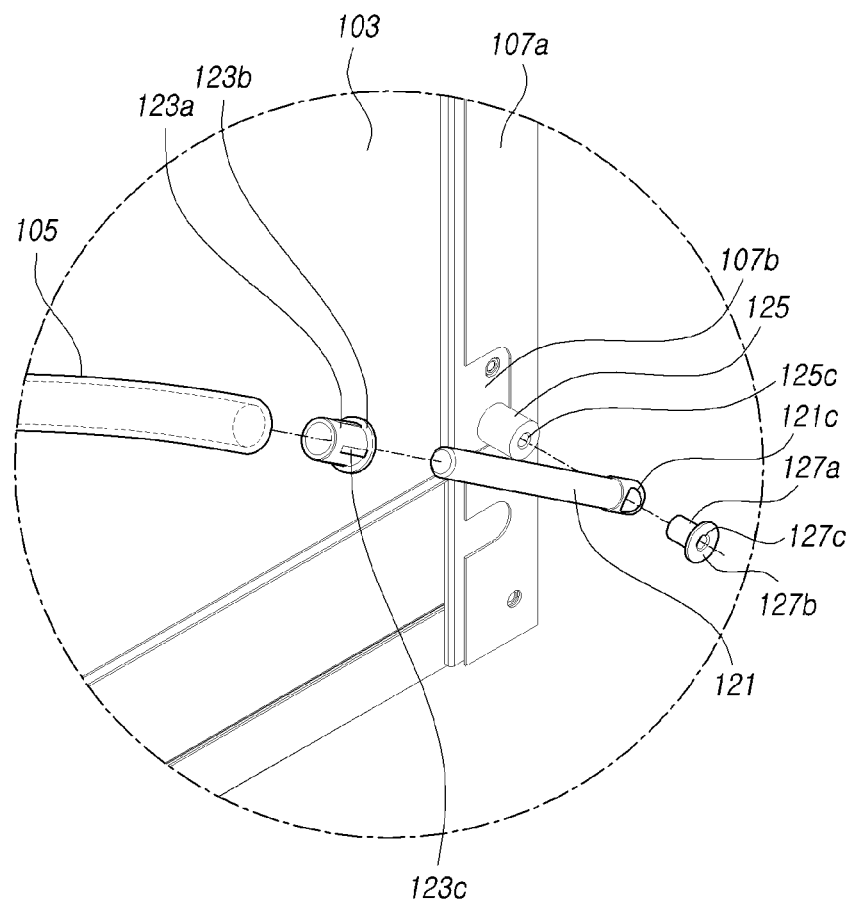
FIGS. 12 and 13 are respectively a perspective view and a sectional view illustrating a part of the flexible display device according to embodiments of the present disclosure.
Figure 13:
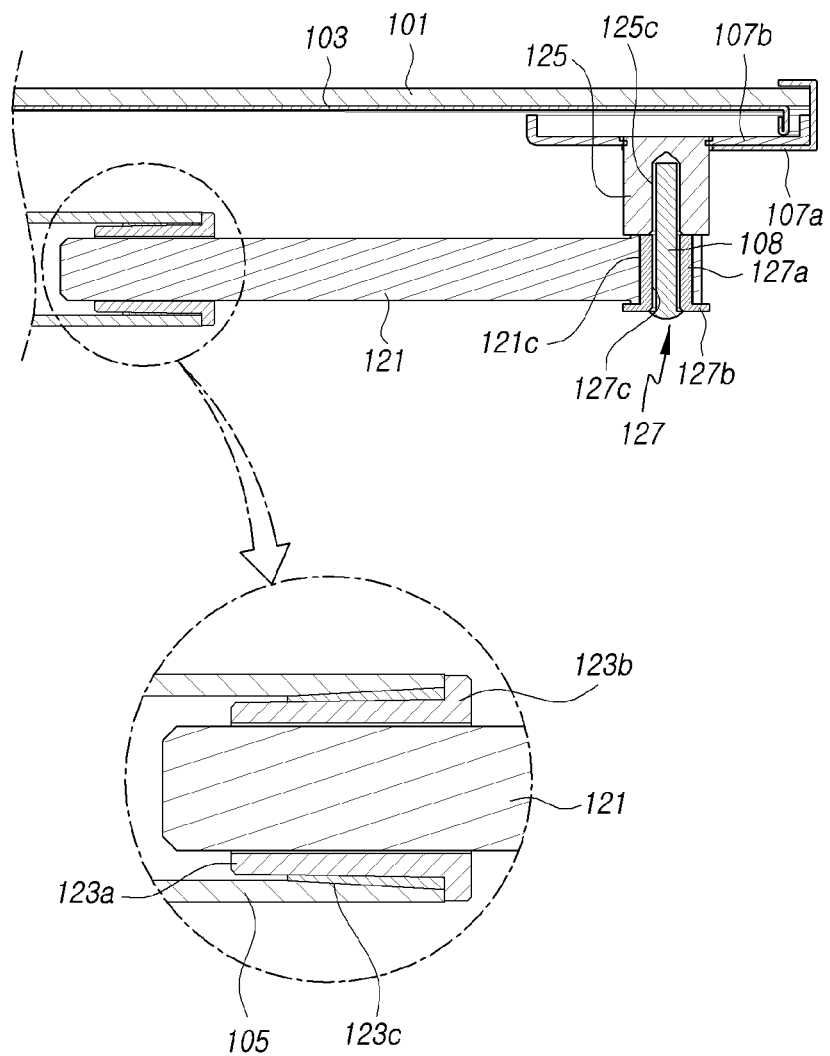

FIGS. 1, 2 and 3 are perspective views illustrating a flexible display device according to embodiments of the present disclosure. FIG. 4 is a plan view illustrating the flexible display device according to embodiments of the present disclosure. FIGS. 5 and 6 are sectional views illustrating a part of the flexible display device according to embodiments of the present disclosure. FIGS. 7 and 8 are perspective views illustrating a part of the flexible display device according to embodiments of the present disclosure. FIG. 9 is a rear view illustrating a part of the flexible display device according to embodiments of the present disclosure. FIGS. 10 and 11 are respectively a perspective view and a sectional view illustrating a part of the flexible display device according to embodiments of the present disclosure. FIGS. 12 and 13 are respectively a perspective view and a sectional view illustrating a part of the flexible display device according to embodiments of the present disclosure.

As illustrated in FIGS. 1 to 13, a flexible display device 100 according to embodiments of the present disclosure may include a back cover 103 supporting the rear surface of a display panel 101, a bending member 105 which is bent with a curvature and supports the rear surface of the back cover 103, a sliding member 110 by which the bending member 105 is rotatably supported, which is mounted onto the rear surface of the back cover 103, and which rotates the bending member 105, while sliding up and down on the back cover 103, and a rotation supporting member 121 having one end portion slidably and rotatably engaged with an end portion of the bending member 105 and the other end portion rotatably engaged with the back cover 103.

First, referring to FIGS. 1, 2 and 3, one or more bending members 105 may be provided in embodiments of the present disclosure. One bending member 105 is illustrated in FIG. 1 and two bending members 105 are illustrated in FIGS. 2 and 3, by way of example.

Rotation supporting members 121 provided at both ends of the bending member 105 may be engaged with the back cover 103 or with reinforcement brackets 107a and 107b separately installed on the back cover 103. The rotation support members 121 are shown as engaged with the back cover 103 in FIG. 1 and as engaged with the reinforcement brackets 107a and 107b in FIGS. 2 and 3, by way of example. Unless otherwise specifically mentioned, the rotation support members 121 will be described as engaged with the back cover 103 in the following description.

Further, the display panel 101 is supportedly engaged with the front of the back cover 103. In embodiments of the present disclosure, the display panel 101 may be applied irrespective of whether the display panel 101 is a liquid crystal display (LCD) panel or a light emitting display panel.

That is, when the display panel 101 is configured as an LCD panel, the flexible display 100 may further include a backlight unit irradiating light onto the LCD panel, a lower polarization plate attached to a lower substrate, and an upper polarization plate attached to the front surface of an upper substrate. The specific configurations of the lower substrate and the upper substrate may be formed in various manners known to those skilled in the art according to, for example, twisted nematic (TN) mode, vertical alignment (VA) mode, in plane switching (IPS) mode, and fringe field switching (FFS) mode.

When the display panel 101 is configured as a light emitting display panel, the light emitting display panel may include a lower substrate in which a plurality of light emitting cells are formed in respective areas defined by gate lines, data lines, and power (VDD) lines, and an upper substrate face to face bonded to the lower substrate. This configuration is well known in the art to which the present disclosure is relevant, and thus related drawings and detailed description are not provided herein.

As such, the display panel 101 may be used irrespective of its type in embodiments of the present disclosure. Accordingly, the following description is given irrespective of the type of a display panel.

In embodiments of the present disclosure, the sliding member 110 rotatably engaged with roughly the center of the bending member 105 rotates the bending member 105 rotatably engaged with both side ends of the back cover 103 by sliding up and down on the back cover 103. Therefore, different curvature radiuses may be set in flat mode A and curved mode B, and even in the curved mode, various curvature radiuses may be set, as illustrated in FIG. 4.

The bending member 105 may be formed of an aluminum alloy having a high strength or a metal such as stainless steel to bend the display panel 101 and the back cover 103. The bending member 105 may be formed to have a specific curvature which allows a user to view the flexible display device 100 comfortably.

For example, the bending member 105 may be bent with a curvature radius R of about 5000 to 1000 mm and mounted to the rear surface of the back cover 103.

In the flat mode A, the bending member 105 rotates by the sliding member 110, so that the center point of the curvature of the bending member 105 is located on a plane parallel to the back cover 103 as illustrated in FIGS. 1, 2 and 3, whereas in the curved mode B, the bending member 105 rotates by the sliding member 110, so that the center point of the curvature of the bending member 105 is located ahead of or behind the plane, perpendicularly to the back cover 103 as illustrated in FIG. 4.

That is, in the curved mode B, the bending member 105 rotates so that a plane defined by the bending member 105 and the center point of the curvature may be perpendicular to the back cover 103, whereas in the flat mode A, the bending member 105 rotates so that the plane defined by the bending member 105 and the center point of the curvature may be parallel to the back cover 103 and thus the flat mode A switches to the curved mode B by the elastic deformation of the back cover 103.

Further, a guide member 130 may be engaged with the rear surface of the back cover 103 to allow the bending member 105 to rotate supportedly, when the bending member 105 rotates. The guide member 130 is provided with a slot hole into which the bending member 105 is inserted and supported.

As illustrated in FIG. 3, one or more guide members 130 may be provided on each of both sides of the back cover 103 with respect to the sliding member 110, so that the bending member 105 may rotate more easily.

To enable the user to change the curvature of the display panel more easily, a grip member 119 may be mounted to the sliding member 110. Thus, the user may move the sliding member 110 up and down on the back cover 103 using the grip member 119.

As illustrated in FIGS. 1, 2 and 3, the sliding member 110 that rotates the bending member 105 may include a fixed rail member 113 mounted on the rear surface of the back cover 103 and a movement rail member 111 sliding up and down on the back cover 103, while being supported by the fixed rail member 113.

While the fixed rail member 113 may be integrated with the back cover 103 by cutting a part of the rear surface of the back cover 103 and bending the cut part, the fixed rail member 113 is shown as mounted on the rear surface of the back cover 103, by way of example, in embodiments of the present disclosure.

The sliding member 110 may further include a connection member 115 which includes a support portion 115a surrounding the outer circumferential surface of the bending member 105 and supporting rotation of the bending member 105, and fixed portions 115b connected to the support portion 115a and fixed to the movement rail member 111.

Referring to FIG. 7, the fixed portions 115b of the connection member 115 may contact at least partially with the movement rail member 111 to fixedly move along with the movement rail member 111, and may be fixed to the movement rail member 111 through engagement holes 115c by means of fastening members (not shown). The aforedescribed grip member 119 may be fixed together with the fixed portions 115b through the engagement holes 115c by the fastening members.

The support portion 115a, which surrounds the outer circumferential surface of the bending member 105, apart from the outer surface of the movement rail member 111, may be shaped into an arc or protrude from the fixed portions 115b. An incision groove 115e may be formed between both sides of the bending member 105.

A ring-shaped protruding support 140 may be engaged or integrated with the bending member 105 on the outer circumferential surface of the center of the bending member 105 rotationally supported by the support portion 115a, and may be supportedly inserted into the incision groove 115e of the support portion 115a.

Therefore, as the protruding support 140 is assembled into the incision groove 115e of the support portion 115a during assembly, it becomes easy to identify an assembly position of the bending member 105. After the assembly, when the bending member 105 rotates, the protruding support 140 may be supported by the support portion 115a, so that the bending member 105 may rotate without vertical or horizontal slip-off.

Further, the connection member 115 may be provided with pointers 115d on one or both side ends of a fixed portion 115b, and an indicator 103d with curvature radiuses of the back cover 103 written thereon in correspondence with positions of the pointer 115d may be provided on the rear surface of the back cover 103, as illustrated in FIG. 8.

The indicator 103d indicates a curvature radius R of the back cover 103 corresponding to the amount of rotation of the bending member 105, that is, the amount of sliding movement of the movement rail member 111, by a scale and a number. For example, the indicator 103d is formed by marking Flat and the curvature radiuses R in a descending order on the rear surface of the back cover 103.

Therefore, when the user adjusts a curvature radius of the display panel 101, the user may easily adjust the curvature of the display panel 101 by stopping the movement rail member 111 in alignment between the pointer 115d and an intended curvature radius on the indicator 103d.

In embodiments of the present disclosure, the sliding member 110 may be provided with a structure in which the fixed rail member 113 and the movement rail member 111 may slide supportedly in engagement with each other, as illustrated in FIGS. 5 and 6.

Referring to FIG. 5, the fixed rail member 113 may include an engagement portion 113a disposed on the back cover 103, fixed end portions 113b bent at both ends of the engagement portion 113a, and support end portions 113c bent at ends of the fixed end portions 113b, facing each other. The movement rail member 111 may include support grooves 111c at both side end portions, into which the support end portions 113c are supportedly inserted.

Therefore, the movement rail member 111 may slide up and down on the back cover 103, while the support grooves 111c at both side end portions of the movement rail member 111 are supported by the support end portions 113c of the fixed rail member 113.

A fixing knob 117 may be engaged with the movement rail member 111 and the fixed rail member 113 to fix the movement rail member 111 after the sliding is completed.

That is, the movement rail member 111 may be provided with a slit hole 111a elongated in the vertical direction of the back cover 103, as illustrated in FIGS. 1, 2 and 3.

A fixing hole 113d with a screw groove formed therein is formed on the fixing rail member 113, so that when a screw portion 117a of the fixing knob 117 is fastened in the fixing hole 113d through the slit hole 111a, the head of the fixing knob 117 may be brought into close contact with the movement rail member 111 and fix the position of the movement rail member 111 by its pressing force.

Further, referring to FIG. 6, the fixed rail member 113 may include the engagement portion 113a disposed on the back cover 103 and curved recesses 113e on inner surfaces of the fixed end portions 113b bent from both ends of the engagement portion 113a.

The movement rail member 111 may include opposing end portions 111b bent inward of the fixed end portions 113b from both ends of a spaced portion 111c apart in parallel from the engagement portion 113a, and rotation members 114 which rotate, supported between the outer surfaces of the opposing end portions 111b and the curved recesses 113e.

In the illustrated case of FIG. 6, the sliding member 110 may further include an inner rail member 116 disposed between the fixed rail member 113 and the movement rail member 111, and may be provided, at both side ends thereof, with insertion holes 116a into which the rotation members 114 are inserted and rotatably supported. The rotation members 114 may be mounted in the insertion holes 116a, and may be any of balls, rollers, or the like which may make a rolling motion.

Therefore, as the movement rail member 111 slides up and down on the back cover 103 by rolling motions of the rotation members 114, with the outer surfaces of the opposing end portions 111b supported by the rotation members 114, the sliding may be more easily made.

After the movement rail member 111 completes sliding, the screw portion 117a of the fixing knob 117 may be fastened into the fixing hole 113d through the slit hole 111a. Thus, the head of the fixing knob 117 may be brought into close contact with the movement rail member 111 and fix the position of the movement rail member 111 by its pressing force.

The bending member 105 may be formed into a bent pipe with an inner empty space, or a solid bent bar. When the bending member 105 is formed into a solid bent bar, insertion grooves 106 may be provided at both end portions of the bending member 105, and one end of each of the rotation supporting members 121 may be inserted into one of the insertion grooves 106, so that sliding and rotation of the rotation supporting member 121 may be supported, as illustrated in FIG. 9.

Therefore, as the bending member 105 is formed into a pipe or bar having a round outer circumferential surface and has a structure in which ends of the rotation supporting members 121 may be inserted, the rotation and sliding resistances of the sliding member 110 and the rotation support members 121 are reduced during rotation of the being member 105. Thus, the radius of curvature of the display panel and the back cover 103 may be changed with a reduced operating force applied by the user and a smooth operation without jamming.

Further, the rotation support members 121 may be engaged directly with the back cover 103, or with the back cover 103 with the aid of the reinforcement brackets 107a and 107b installed on the back cover 103, as described before. The rotation support members 121 are shown as directly engaged with the back cover 103 in FIGS. 9, 10 and 11, whereas the rotation support members 121 are shown as engaged with the reinforcement brackets 107a and 107b in FIGS. 12 and 13, by way of example.

First, as illustrated in FIG. 9, a rotation support member 121 having one end portion engaged with the bending member 105 is provided with a hinge hole 121c at the other end portion thereof, so that the rotation support member 121 may be rotatably engaged with the back cover 103 by fastening the rotation support member 121 to the back cover 103 through the hinge hole 121 by means of a fastening member (not shown).

A cap member 123 may be engaged around the outer circumference of the one end of the rotation support member 121 and inserted into the end portion of the bending member 105 to support sliding and rotation of the rotation support member 121.

The cap member 123 may be formed of plastic resin or rubber, which is elastically deformable. When the rotation support member 121 slides and rotates into the inside of the bending member 105 during rotation of the bending member 105, the cap member 123 may prevent damage and noise which might otherwise be caused by bumps and scratches between the rotation support member 121 and the inner surface of the bending member 105.

As illustrated in FIGS. 10 and 11, the back cover 103 may be engaged with a fixing member 125 having a screw hole 125c therein, and a rotation guide member 127 having a through hole 127c through which an engagement member 108 penetrates may be engaged in the hinge hole 121c of the rotation support member 121. Thus, the rotation support member 121 may be rotatably engaged with the fixing member 125 by means of the engagement member 108.

The fixing member 125 may be fixed to the back cover 103 by bonding, welding, fusion, or the like.

A body 127a of the rotation guide member 127 penetrates through the hinge hole 121c of the rotation support member 121 to support rotation of the rotation support member 121, and a head 127b of the rotation guide member 127 may prevent slip-off of the rotation support member 121.

The cap member 123 may include a body 123a which is formed to be hollow to allow one end portion of the rotation support member 121 to be inserted therethrough, and inserted into the bending member 105, and a head 123b supported by an end portion of the bending member 105.

A tapered portion 123c may be provided on the outer circumferential surface of the cap member 123, protruding along a longitudinal direction, with the protrusion increasing toward the head 123b, so that the cap member 123 may be pressed-fit into the bending member 105.

Therefore, when the cap member 123 is inserted into and hence engaged with the bending member 105, the tapered portion 123c may be compressed and inserted, so that the cap member 123 may be fixed without slip-off during sliding and rotation of the rotation support member 121.

Referring to FIGS. 12 and 13 illustrating an embodiment in which the rotation support members 121 are engaged with the back cover 103 with the aid of the reinforcement brackets 107a and 107b, the reinforcement brackets 107a and 107b may be engaged with both ends of the back cover 103 supporting the load when the rotation supporting members 121 rotate, thereby increasing the rigidity of the back cover 103.

The reinforcement brackets 107a and 107b include an inner bracket 107b and an outer bracket 107a. The inner bracket 107b has both ends bent toward the back cover 103, apart from the rear surface of the back cover 103, and the outer bracket 107a is bent to the front of the display panel 101 so as to surround end portions of the back cover 103 and the display panel 101, while overlapping with one end portion of the inner bracket 107b, thereby protecting the end portion of the back cover 103 and the display panel 101.

Further, the fixing member 125 having the screw hole 125c may be engaged with the inner bracket 107b, and the rotation guide member 127 having the through hole 127c through which the engagement member 108 penetrates may be engaged in the hinge hole 121c of the rotation support member 121. Thus, the rotation support member 121 may be rotatably engaged with the fixing member 125 by the engagement member 108.

Therefore, the inner bracket 107b and the outer bracket 107a distributedly absorb load transferred through the fixing member 125 during rotation of the bending member 105 and the rotation support member 121, thereby reducing deformation and damage to the display panel 101.

As described above, according to embodiments of the present disclosure, a flexible display device for which a user may freely change a curvature to that of a flat display or a curved surface display may be provided.

Further, according to embodiments of the present disclosure, there may be provided a flexible display device for which a user may easily achieve a desired curvature from the center to both end portions of a display panel irrespective of the size of the flexible display device, and thus which may accommodate various users' demands.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A flexible display device comprising:
   a back cover supporting a rear surface of a display panel;
   a bending member bent with a curvature and supporting a rear surface of the back cover;
   a sliding member supporting the bending member to be rotatable, mounted on the rear surface of the back cover, and rotating the bending member, while sliding up and down on the back cover; and
   a rotation support member having one end portion slidably and rotatably engaged with an end portion of the bending member and another end portion rotatably engaged with the back cover.

2. The flexible display device according to claim 1, further comprising:
   one or more guide members each having a slot hole formed therein into which the bending member is inserted and supported is engaged with the rear surface of the back cover.

3. The flexible display device according to claim 2, wherein at least one guide member is disposed on each of both sides of the back cover with respect to the sliding member.

4. The flexible display device according to claim 1, further comprising:
   a grip member mounted on the sliding member and moving up and down the sliding member on the back cover.

5. The flexible display device according to claim 1, wherein the sliding member comprises:
   a fixed rail member mounted on the rear surface of the back cover; and
   a movement rail member supported by the fixed rail member and sliding up and down on the back cover.

6. The flexible display device according to claim 5, wherein the sliding member further comprises a connection member including a support portion surrounding an outer circumferential surface of the bending member and supporting rotation of the bending member, and a fixed portion connected to the support portion and fixed to the movement rail member.

7. The flexible display device according to claim 6, wherein the connection member is provided with pointers at one end or both side ends of the fixed portion, and an indicator having curvature radiuses of the back cover marked thereon in correspondence with upper and lower positions of the pointers on the rear surface of the back cover.

8. The flexible display device according to claim 5, wherein the fixed rail member is provided with an engagement portion disposed on the back cover, fixed end portions bent at both ends of the engagement portion, and support end portions bent at both ends of the fixed end portions, facing each other, and the movement rail member is provided with support grooves at both side ends thereof, into which the support end portions are inserted and supported.

9. The flexible display device according to claim 5, wherein the movement rail member includes a slit hole elongated in a vertical direction of the back cover, the fixed rail member includes a fixing hole opposing the slit hole, and a fixing knob is engaged in the slit hole and the fixing hole to fix the movement rail member.

10. The flexible display device according to claim 5, wherein the fixed rail member includes an engagement portion disposed on the back cover, and curved recesses on inner surfaces of fixed end portions bent at both ends of the engagement portion; and
    wherein the movement rail member includes opposing end portions bent inward of the fixed end portions from both ends of a spaced portion apart in parallel from the engagement portion, and rotation members provided to be supported and rotate between outer surfaces of the opposing end portions and the curved recesses.

11. The flexible display device according to claim 10, wherein the sliding member includes insertion holes at both side ends thereof, into which the rotation members are inserted and rotatably supported, and further comprises an inner rail member disposed between the fixed rail member and the movement rail member.

12. The flexible display device according to claim 1, wherein the bending member is shaped into a hollow pipe.

13. The flexible display device according to claim 1, wherein the bending member is provided, at each of both end portions thereof, with an insertion groove into which an end of the rotation support member is inserted and slides.

14. The flexible display device according to claim 1, wherein the rotation support member is provided, at the other end portion thereof, with a hinge hole, and rotatably engaged with the back cover by an engagement member.

15. The flexible display device according to claim 14, wherein a fixing member having a screw hole formed therein is engaged with the back cover, and a rotation guide member having a through hole through which the engagement member penetrates is engaged in the hinge hole.

16. The flexible display device according to claim 1, further comprising:
    a cap member engaged with an outer circumference of an end portion of the rotation support member, inserted into an end portion of the bending member, and supporting sliding and rotation of the rotation support member.

17. The flexible display device according to claim 1, wherein reinforcement brackets rotatably engaged with the rotation support member are engaged with both end portions of the back cover.

18. The flexible display device according to claim 17, wherein the reinforcement brackets comprise:
    an inner bracket having both end portions bent toward the back cover, apart from the rear surface of the back cover, and engaged with the rotation support member to be rotatable; and an outer bracket overlapping with one end portion of the inner bracket and bent to a front surface of the display panel to surround end portions of the back cover and the display panel.

19. The flexible display device according to claim 18, wherein the inner bracket is engaged with a fixing member having a screw hole formed therein, the rotation support member is provided, at the other end portion thereof, with a hinge hole, and the hinge hole includes a through hole into which an engagement member penetrates.

* * * * *